United States Patent
Zhang

(10) Patent No.: US 11,978,952 B2
(45) Date of Patent: May 7, 2024

(54) NFC ANTENNA AND NFC COMMUNICATION APPARATUS FOR MOBILE TERMINAL

(71) Applicant: GUANGDONG OPPO MOBILE TELECOMMUNICATIONS CORP., LTD., Guangdong (CN)

(72) Inventor: Shengqiang Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 229 days.

(21) Appl. No.: 17/677,562

(22) Filed: Feb. 22, 2022

(65) Prior Publication Data

US 2022/0181772 A1 Jun. 9, 2022

Related U.S. Application Data

(63) Continuation of application No. PCT/CN2020/113175, filed on Sep. 3, 2020.

(30) Foreign Application Priority Data

Sep. 4, 2019 (CN) .......................... 201910833232.8
Sep. 4, 2019 (CN) .......................... 201921475237.X

(51) Int. Cl.
*H01Q 1/38* (2006.01)
*H01Q 1/24* (2006.01)

(52) U.S. Cl.
CPC .............. *H01Q 1/38* (2013.01); *H01Q 1/243* (2013.01)

(58) Field of Classification Search
CPC .................................. H01Q 1/38; H01Q 1/243
See application file for complete search history.

(56) References Cited

U.S. PATENT DOCUMENTS

| | | | | |
|---|---|---|---|---|
| 2014/0027520 A1* | 1/2014 | Kato | ..................... | H04B 5/0062 |
| | | | | 235/492 |
| 2014/0184462 A1* | 7/2014 | Yosui | ....................... | H01Q 7/06 |
| | | | | 343/788 |
| 2018/0205142 A1 | 7/2018 | Jung et al. | | |

FOREIGN PATENT DOCUMENTS

| | | |
|---|---|---|
| CN | 201303054 Y | 9/2009 |
| CN | 102709686 A | 10/2012 |
| CN | 104659470 A | 5/2015 |
| CN | 204790936 U | 11/2015 |
| CN | 105940550 A | 9/2016 |
| CN | 106058425 A | 10/2016 |
| CN | 207353454 U | 5/2018 |
| CN | 109462021 A | 3/2019 |
| CN | 110504524 A | 11/2019 |

(Continued)

OTHER PUBLICATIONS

European search report for European application No. 20859979.5, mailed Aug. 11, 2022 (9 pages).

(Continued)

*Primary Examiner* — Dieu Hien T Duong
(74) *Attorney, Agent, or Firm* — Young Basile Hanlon & MacFarlane, P.C.

(57) ABSTRACT

Disclosed are a near field communication (NFC) antenna and an NFC communication apparatus for a mobile terminal. The NFC antenna includes a substrate; a ferrite, disposed on the substrate; and a first flexible printed circuit (FPC) antenna, disposed on the ferrite and including a first end and a second end.

14 Claims, 2 Drawing Sheets

(56) References Cited

FOREIGN PATENT DOCUMENTS

| | | |
|---|---|---|
| CN | 210535807 U | 5/2020 |
| EP | 2579388 A2 | 4/2013 |
| IN | 106410369 A | 2/2017 |
| KR | 1339018 B1 * | 12/2013 |
| WO | 2014088635 A1 | 6/2014 |
| WO | 2016060431 A1 | 4/2016 |
| WO | 2017194029 A1 | 11/2017 |

OTHER PUBLICATIONS

International Search Report with English Translation for PCT Application PCT/CN2020/113175 mailed Dec. 2, 2020. (13 pages).
Chinese First Office Action with English Translation for CN Application 201910833232.8 mailed Nov. 30, 2023. (11 pages).

* cited by examiner

NFC ANTENNA AND NFC COMMUNICATION APPARATUS FOR MOBILE TERMINAL

CROSS-REFERENCE TO RELATED APPLICATION(S)

The present application is a continuation-application of International (PCT) Patent Application No. PCT/CN2020/113175, filed on Sep. 3, 2020, which claims foreign priority of Chinese Patent Applications No. 201910833232.8 and No. 201921475237.X, both filed on Sep. 4, 2019, the entire contents of all of which are hereby incorporated by reference.

TECHNICAL FIELD

The present disclosure relates to the field of terminal technologies, and in particular to an NFC antenna and an NFC communication apparatus for a mobile terminal.

BACKGROUND

At present, near field communication (NFC) technology is continuously popularized in mobile terminals (such as mobile phone, wearable device, etc.), prompting major mobile Internet companies to actively research and develop NFC applications and promote the continuous development of the NFC technology. In the field of NFC applications, the following applications are mainly included: mobile payment, public transportation, identity recognition and intelligent communication.

In order to meet various needs of users for NFC, and to adapt to the increasingly complex overall environment of the mobile terminals, the form of NFC antennas is constantly changing. There are two common NFC antennas: NFC coil antenna and NFC diversity antenna.

SUMMARY

In a first aspect, the present disclosure provides a near field communication (NFC) antenna for a mobile terminal, comprising: a substrate; a ferrite, disposed on the substrate; and a first flexible printed circuit (FPC) antenna, disposed on the ferrite and comprising a first end and a second end.

In a second aspect, the present disclosure provides an NFC communication apparatus for a mobile terminal, comprising: the NFC antenna provided in the first aspect; a matching network, connected to the NFC antenna; and an NFC chip, connected to the matching network.

BRIEF DESCRIPTION OF DRAWINGS

The above and/or additional aspects and advantages of the present disclosure will become obvious and easy to understand from the following description of the embodiments in conjunction with the accompanying drawings.

DETAILED DESCRIPTION

Figure 1:
FIG. 1 is a structural schematic view of an NFC antenna for a mobile terminal according to an embodiment of the present disclosure.

The embodiments of the present disclosure are described in detail below. Examples of the embodiments are shown in the accompanying drawings, wherein same or similar reference numerals indicate same or similar elements or elements with same or similar functions. The embodiments described below with reference to the drawings are exemplary, and are intended to explain the present disclosure, but should not be understood as a limitation to the present disclosure.

Referring to FIG. 1, in some embodiments, a near field communication NFC antenna for a mobile terminal includes a substrate 10, a ferrite 20 disposed on the substrate 10, and a first flexible printed circuit (FPC) antenna 30 disposed on the ferrite 20. The first FPC antenna 30 includes a first end and a second end.

Figure 2:
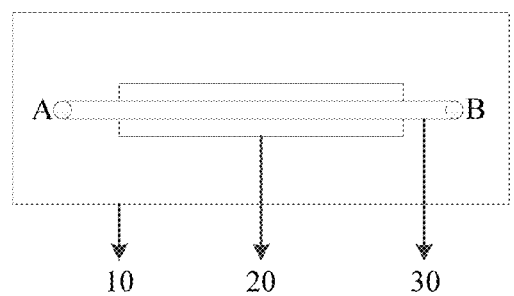
FIG. 2 is a top schematic view of the NFC antenna as shown in FIG. 1 according to an embodiment of the present disclosure.

Referring to FIG. 2, in some embodiments, the first end A is a feeding point, and the second end B is a grounding point.

In some embodiments, the length of the first FPC antenna 30 is greater than the length of the ferrite 20, such that the first end and the second end are suspended relative to the substrate 10.

Figure 4:
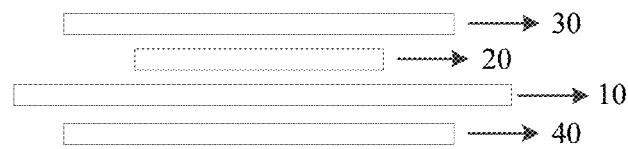
FIG. 4 is a structural schematic view of an NFC antenna for a mobile terminal according to another embodiment of the present disclosure.

Referring to FIG. 4, in some embodiments, an NFC communication apparatus further includes: a second FPC antenna 40, and the second FPC antenna 40 includes a third end and a fourth end.

In some embodiments, the second end and the fourth end are connected.

In some embodiments, the first end faces the third end, and the second end faces the fourth end.

In some embodiments, the first FPC antenna 30 and the second FPC antenna 40 are not overlapped.

Figure 6:
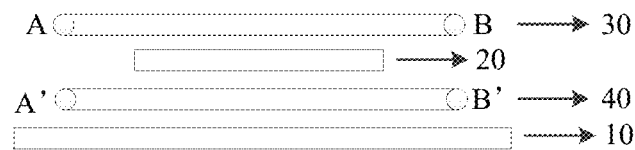
FIG. 6 is a side schematic view of an NFC antenna for a mobile terminal according to further another embodiment of the present disclosure.

Referring to FIG. 6, in some embodiments, the second FPC antenna 40 is disposed between the substrate 10 and the ferrite 20.

Figure 5:
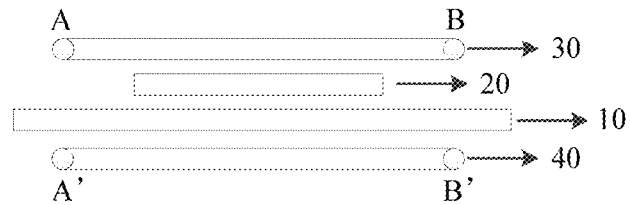
FIG. 5 is a side schematic view of the NFC antenna as shown in FIG. 4 according to an embodiment of the present disclosure.

Referring to FIG. 5, in some embodiments, the first FPC antenna 30 is disposed on a side of the substrate 10, and the second FPC antenna 40 is disposed on another side of the substrate opposite to the first FPC antenna 30.

In some embodiments, the NFC antenna may be in the shape of a straight line, "L", "⌐" or "U".

It is noted that the "L" shape refers to a shape including a first portion and a second portion each in a shape of a straight line. The first portion extends from an end of the second portion in a direction perpendicular to the second portion.

It is noted that the "⊏" shape refers to a shape including a first portion, a second portion, and a third portion each in a shape of a straight line. An end of the first portion is connected to an end of the second portion, and the other end of the second portion is connected to an end of the third portion. The first portion, the second portion, and the third portion are disposed in a same plane, and the first portion and the third portion are disposed at a same side of the second portion.

It is noted that the "U" shape refers to a shape including a first portion, a second portion, and a third portion. The first portion and the third portion are each in a shape of a straight line, and the second portion is in a curved shape. An end of the first portion is connected to an end of the second portion, and the other end of the second portion is connected to an end of the third portion. The first portion, the second portion, and the third portion are disposed in a same plane, and the first portion and the third portion are disposed at a same side of the second portion.

Figure 7:
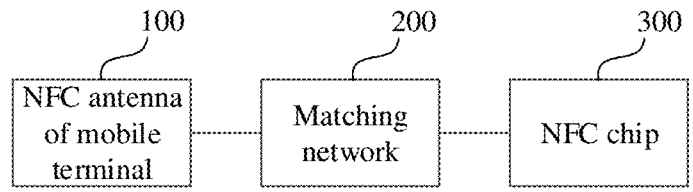
FIG. 7 is a structural schematic view of an NFC communication apparatus for a mobile terminal according to an embodiment of the present disclosure.

Referring to FIG. 1 and FIG. 7, an NFC communication apparatus for a mobile terminal of the present disclosure includes: an NFC antenna 100, a matching network 200 connected to the NFC antenna 100, and an NFC chip 300 connected to the matching network. The NFC antenna 100 includes a substrate 10, a ferrite 20 disposed on the substrate 10, and a first flexible printed circuit (FPC) antenna 30 disposed on the ferrite 20. The first FPC antenna 30 includes a first end and a second end.

Referring to FIG. 2, in some embodiments, the first end A is a feeding point, and the second end B is a grounding point.

In some embodiments, the length of the first FPC antenna 30 is greater than the length of the ferrite 20, such that the first end and the second end are suspended relative to the substrate 10.

Referring to FIG. 4, in some embodiments, an NFC communication apparatus further includes: a second FPC antenna 40, and the second FPC antenna 40 includes a third end and a fourth end.

In some embodiments, the second end and the fourth end are connected.

In some embodiments, the first end faces the third end, and the second end faces the fourth end.

In some embodiments, the first FPC antenna 30 and the second FPC antenna 40 are not overlapped.

Referring to FIG. 6, in some embodiments, the second FPC antenna 40 is disposed between the substrate 10 and the ferrite 20.

Referring to FIG. 5, in some embodiments, the first FPC antenna 30 is disposed on a side of the substrate 10, and the second FPC antenna 40 is disposed on another side opposite to the first FPC antenna 30.

In some embodiments, the NFC antenna may be in the shape of a straight line, "L", "⊏" or "U".

In recent years, the research of NFC technology is mainly distributed in four fields, including theory and development of NFC, basic research of NFC, research of NFC application and service, research of NFC application environment, etc. NFC working modes mainly include three types: reader mode, card emulation mode, and point-to-point mode.

The document "NFC Research Framework: A Literature Review and Future Research Directions" counts the publication of articles on NFC technology in major journals and conferences from 2006 to 2010. The statistical results show that in the four research fields, the NFC application and service accounted for the largest proportion, reaching 40.54%, and the most studied mode was the reader read-write mode, reaching 51.35%. The results show that in the current research field of NFC technology, the research of NFC application is a mainstream trend and has a relatively broad application prospect.

The wide application of NFC technology is inseparable from the rapid development of current mobile terminals with NFC functions. At present, mobile terminals with NFC functions, such as smartphones, have an increasing market share. Among the total shipments of smartphones in 2017, NFC-enabled mobile phones accounted for more than 60%. With the continuous popularization of NFC technology in mobile terminals, major mobile Internet companies are encouraged to actively research and develop NFC applications, thereby promoting the development of NFC technology. At present, in the field of NFC applications, mainstream applications mainly include the following aspects:

In terms of mobile payment, NFC started late in China. While in Japan, South Korea and other countries, NFC technology has occupied a huge market in mobile payment. In recent years, China has also launched a series of policies to encourage the application of NFC technology in the field of mobile payment. Using NFC-enabled mobile phones as "electronic wallets" can simplify the payment process and make payments more secure, reliable and efficient.

In terms of public transportation, Beijing bus and subway have already realized the function of "scanning mobile phone", the operation process does not need to connect to the network, and it is also possible to scan cards for the mobile phone with NFC function when the phone is turned off, which greatly facilitates people's travel. In the field of bicycle sharing, Mobike and Ofo bicycle sharing have also realized the NFC unlocking function, which allows users to use their mobile phones to unlock the bicycle quickly, thereby solving the security problems encountered with barcode unlocking and making the operation more convenient.

In terms of identity recognition, NFC technology has a wide range of applications in the fields of access control, logistics, attendance, and inspection due to its two-way authentication characteristics. Some building access control systems have added the NFC recognition function, and residents can use smart wearable devices such as mobile phones or bracelets with NFC functions to open the access control. Another important application for identity authentication is electronic business cards. When two mobile phones with NFC function are close, the function of exchanging business cards can be realized, which is fast and efficient, and can also avoid problems such as loss and wear of traditional business cards.

In terms of intelligent communication, NFC technology can carry out fast communication with mobile terminals, and has a shorter transmission distance and a higher security level. Therefore, NFC technology has a wide range of applications in the fields of electronic tickets, smart homes, private file transfers, games, and social networks.

In the related art, in order to meet the various needs of users for NFC and to adapt to the increasingly complex environment of mobile terminals, the form of NFC antennas is constantly changing. There are two common NFC antennas: NFC coil antenna (such as Xiaomi® 8, Huawei® Mate® 20 Pro, etc.) and NFC diversity antenna (such as Honor® 9, Xiaomi® 9, etc.).

However, the NFC coil antenna is a single-layer coil, which has strict requirements on the size of the coil (for example, the coil area of Xiaomi® 8 is 36×31.5 mm$^2$, and the coil area of Huawei® Mate® 20 Pro is 46.6×40 mm$^2$). The current mobile terminals are required to add 5G antenna, and it is therefore difficult to guarantee the required area for the NFC coil antenna. The NFC diversity antenna shares a metal frame with a main antenna of the mobile terminal, which not only needs the metal frame, but also affects the performance of the main antenna, reducing its power by about 1.5 dB. In addition, to reduce the interaction between the main antenna and the NFC diversity antenna, a large inductor is required to be added to the common feed side, which is not conducive to device layout.

Therefore, the present disclosure mainly aims at the technical problems existing in the above-mentioned NFC coil antenna and NFC diversity antenna in the related art, and proposes an NFC antenna for a mobile terminal.

The NFC antenna used in the mobile terminal of the present disclosure adopts one FPC antenna for radiation, which can effectively reduce the occupied area of the NFC antenna and has strong applicability in an increasingly complex mobile terminal antenna environment. In addition, the use of a separate FPC antenna for radiation, not shared with the main antenna, can reduce the impact on the performance of the main antenna by avoiding a certain distance in the design process. Moreover, the use of large inductors may be avoided, which is conducive to device layout.

The following describes the NFC antenna and NFC communication apparatus for a mobile terminal proposed in the embodiments of the present disclosure with reference to the accompanying drawings. Before describing the embodiments of the present disclosure in detail, in order to facilitate understanding, some common technical words will be introduced.

FPC refers to the abbreviation of flexible printed circuit.

FIG. 1 is a structural schematic view of an NFC antenna for a mobile terminal according to an embodiment of the present disclosure.

In the embodiments of the present disclosure, the mobile terminal may be, for example, a mobile phone, a tablet computer, a personal digital assistant, a wearable device, a vehicle-mounted device, and other hardware devices with various operating systems, touch screens, and/or display screens.

As shown in FIG. 1, the NFC antenna for a mobile terminal includes: a substrate 10, a ferrite 20 disposed on the substrate 10, and a first FPC antenna 30 disposed on the ferrite 20. The first FPC antenna 30 includes a first end and a second end. It should be noted that FIG. 1 shows only a side view of the NFC antenna as an example.

In the embodiments of the present disclosure, the NFC antenna includes the first FPC antenna 30, and the first FPC antenna 30 is a radiator of the NFC antenna, which produces NFC performance. The two ends of the first FPC antenna 30 are respectively connected to a feed network and a metal ground. For example, the first end of the first FPC antenna 30 may be a feeding point, and the second end may be a grounding point. Alternatively, the first end of the first FPC antenna 30 may be a grounding point, and the second end may be a feeding point. A current provided by the feed network flows into the feeding point and generates a current from the feeding point to the grounding point, thereby generating a magnetic field.

Figure 3:
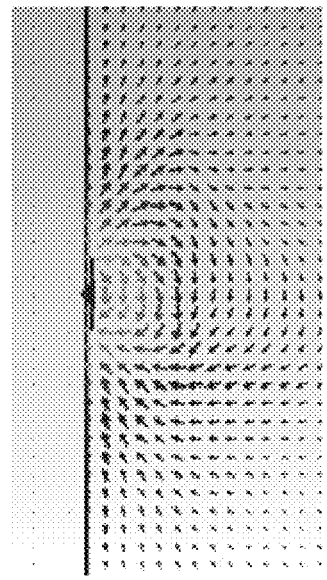
FIG. 3 is a schematic view of a magnetic field generated by the NFC antenna as shown in FIG. 1 according to an embodiment of the present disclosure.

As an example, refer to FIG. 2, FIG. 2 is a top schematic view of the NFC antenna as shown in FIG. 1 according to an embodiment of the present disclosure. The first end is taken as an end A and the second end is taken as an end B as an example. Among them, the end A is the feeding point, which is connected to the feed network, and the end B is the grounding point, which is connected to the metal ground. When the current provided by the feed network flows into the end A, since the end B is grounded, a current of A→B will be generated on the first FPC antenna 30, thereby generating a magnetic field as shown in FIG. 3.

In the embodiments of the present disclosure, the NFC antenna may further include a ferrite 20. The ferrite 20 may shield the influence of a metal environment under the substrate 10 on the NFC performance, and may ensure that NFC performs normally.

In the embodiments of the present disclosure, the NFC antenna further includes the substrate 10. The substrate 10 may also be called a support plate, which mainly functions to support the NFC antenna, and may enable a main board platen holder, a battery, or the use of graphite or adhesive to affix the first FPC antenna 30 and ferrite 20 on an upper layer to a battery back shell. For example, the substrate 10 may be a battery back cover.

The NFC antenna of the embodiments of the present disclosure adopts only one FPC antenna for radiation, which can effectively reduce the occupied area of the NFC antenna and has strong applicability in an increasingly complex mobile terminal antenna environment. In addition, the use of a separate FPC antenna for radiation, not shared with the main antenna, can reduce the impact on the performance of the main antenna by avoiding a certain distance in the design process. Moreover, the use of large inductors may be avoided, which is conducive to device layout. In other words, the form of the NFC antenna in the present disclosure is a single wire, which is different from the traditional coil NFC antenna and the diversity shared NFC antenna, thereby effectively reducing the area of the NFC antenna and avoiding the influence of the NFC antenna on the main antenna of the mobile terminal.

It should be noted that FIG. 1 and FIG. 2 only take the NFC antenna in a shape of a straight line as an example. In practical applications, the NFC antenna may also be an "L" type, a "凵" type, or a "U" type, etc., which is not limited in the present disclosure.

The NFC antenna used in the mobile terminal of the present disclosure adopts one FPC antenna for radiation, which can effectively reduce the occupied area of the NFC antenna and has strong applicability in an increasingly complex mobile terminal antenna environment. In addition, the use of a separate FPC antenna for radiation, not shared with the main antenna, can reduce the impact on the performance of the main antenna by avoiding a certain distance in the design process. Moreover, the use of large inductors may be avoided, which is conducive to device layout.

As a possible implementation, there are many ways to feed NFC antennas, either single-ended feeding (or unbalanced feeding) as shown in FIG. 1 and FIG. 2, or differential feeding (or balanced feeding), and the differential feeding will be described in detail below with reference to FIG. 4.

FIG. 4 is a structural schematic view of an NFC antenna for a mobile terminal according to another embodiment of the present disclosure.

As shown in FIG. 4, based on the embodiments shown in FIG. 1, the NFC antenna for the mobile terminal may further include: a second FPC antenna 40.

The second FPC antenna 40 plays a role of conducting current, and may include a third end and a fourth end. It should be noted that FIG. 4 shows only a side view of the NFC antenna for example, and the second FPC antenna 40 and the first FPC antenna 30 are disposed on both sides of the substrate 10 for example.

In the embodiments of the present disclosure, when differential feeding is adopted, the first FPC antenna 30 is a main radiation area, and the second FPC antenna 40 is a conduction area (mainly plays a role of conducting current).

The second FPC antenna 40 may be disposed under the substrate 10, that is, the second FPC antenna 40 and the first FPC antenna 30 may be disposed on both sides of the substrate 10. For example, the second FPC antenna 40 may be a wiring on the main board placed under the substrate 10 or an FPC wiring placed under the main board platen holder.

The first end may face the third end, and the second end may face the fourth end.

As a possible implementation manner, the first end and the third end may be connected to two output ports of the feed network, that is, the first end and the third end may be the feeding points. When the feed network supplies power, a current of the first end→the second end→the fourth end→the third end is generated, thereby generating a magnetic field. The second end is connected to the fourth end. For example, the second end and the fourth end may be connected by a connector (metal shrapnel, etc.).

As another possible implementation manner, the second end and the fourth end may be connected to two output ports of the feed network, that is, the second end and the second end may be feeding points. When the feed network supplies power, a current of the second end→the first end→the third end→the fourth end is generated, thereby generating a magnetic field. The first end and the third end are connected. For example, the first end and the third end may be connected by a connector (metal shrapnel, etc.).

As an example, referring to FIG. 5, FIG. 5 is a side schematic view of the NFC antenna as shown in FIG. 4 according to an embodiment of the present disclosure. The second FPC antenna 40 and the first FPC antenna 30 are disposed on both sides of the substrate 10.

In FIG. 5, the first end is taken as an end A, the second end is taken as an end B as an example. The end A is a feeding point to connect to the feed network, and the end B is a grounding point to connect to the metal ground. The third end is taken as an end A' connecting to the feed network, and the fourth end is taken as an end B' as an example. The first FPC antenna 30 in section AB is the main radiation area, and the second FPC antenna 40 in section A'B' is the conduction area (mainly playing a role of conducting current). The end A and the end A' are connected to the two output ports of the feed network, and the end B and the end B' are connected by the connector (metal shrapnel, etc.). When the feed network supplies power, a current of A→B→B'→A' will be generated, thereby generating a magnetic field.

It should be noted that the second FPC antenna 40 may also be disposed between the substrate 10 and the ferrite 20. The second FPC antenna 40 and the first FPC antenna 30 may not be overlapped, that is, they may be staggered and cannot be overlapped up and down. Therefore, by disposing the second FPC antenna 40 and the first FPC antenna 30 without overlapping, the generated magnetic field can be superimposed, the magnetic field strength can be increased, and the NFC performance can be improved. Of course, the second FPC antenna 40 may also be overlapped with the first FPC antenna 30, which is not limited in the present disclosure.

As another example, referring to FIG. 6, FIG. 6 is a side schematic view of an NFC antenna for a mobile terminal according to further another embodiment of the present disclosure. The second FPC antenna 40 is disposed between the substrate 10 and the ferrite 20.

In FIG. 6, the first end is taken as an end A, the second end is taken as an end B as an example. The end A is a feeding point to connect to the feed network, and the end B is a grounding point to connect to the metal ground. The third end is taken as an end A' connecting to the feed network, and the fourth end is taken as an end B' as an example. The first FPC antenna 30 in section AB is the main radiation area, and the second FPC antenna 40 in section A'B' is the conduction area (mainly playing a role of conducting current). The end A and the end A' are connected to the two output ports of the feed network, and the end B and the end B' are connected by the connector (metal shrapnel, etc.). When the feed network supplies power, a current of A→B→B'→A' will be generated, thereby generating a magnetic field.

It should be noted that, in FIGS. 5 and 6, end A and end A' connecting the feed network, and end B and end B' connected by the connector (metal shrapnel, etc.) are only for illustration. In practical applications, the end B and the end B' may be connected to the feed network, and the end A and the end A' may be connected by a connector (metal shrapnel, etc.), which is not limited in the present disclosure.

The NFC antenna of the embodiments of the present disclosure adopts a differential feeding mode. When the second FPC antenna 40 and the first FPC antenna 30 are not overlapped, the generated magnetic field can be superimposed, which can increase the magnetic field strength and improve the NFC performance. In addition, in the present disclosure, there are various feeding modes, either conventional differential feeding or single-ended feeding may be used. The selectivity is diverse, which can improve the applicability of the NFC antenna.

It should be noted that in the foregoing embodiments, for ease of understanding, the length of the first FPC antenna 30 being greater than the length of the ferrite 20 are only for illustration. When the length of the first FPC antenna 30 is greater than the length of the ferrite 20, the first end and the second end may be suspended relative to the substrate 10. However, in actual applications, the present disclosure does not limit the length of the first FPC antenna 30 and the length of the ferrite 20. For example, the length of the ferrite 20 may also be greater than the length of the first FPC antenna 30. In this case, the ferrite 20 may be punched at an end of the first FPC antenna 30, such that the first FPC antenna 30 can be connected to the NFC chip, or the first FPC antenna 30 is connected to the second FPC antenna. For example, the ferrite 20 may be punched at the second end of the first FPC antenna 30, such that the second end is connected to the fourth end of the second FPC antenna 40.

As a possible implementation manner, the length of the first FPC antenna 30 and the second FPC antenna 40 may be the same, or may also be different, which is not limited in the present disclosure. In the above embodiments, the length of the first FPC antenna 30 being same as the length of the second FPC antenna 40 are only for illustration.

In order to implement the above embodiments, the present disclosure also proposes an NFC communication apparatus for a mobile terminal.

FIG. 7 is a structural schematic view of an NFC communication apparatus for a mobile terminal according to an embodiment of the present disclosure.

As shown in FIG. 7, the NFC communication apparatus for a mobile terminal includes: the NFC antenna 100 for the mobile terminal proposed in any of the foregoing embodiments, a matching network 200 connected to the NFC antenna 100, and an NFC chip 300 connected to the matching network 200. In this way, the NFC communication function can be realized.

Figure 8:
FIG. 8 is a structural schematic view of an NFC communication apparatus according to another embodiment of the present disclosure.

As an example, referring to FIG. 8, FIG. 8 is a structural schematic view of an NFC communication apparatus according to another embodiment of the present disclosure. Single-ended feeding is adopted as an example, and the NFC chip is an NFC integrated circuit (IC). The NFC IC is connected to the matching network, and the matching network is connected to the feeding point of the NFC antenna. For example, the matching network may be connected to the end A or end B in FIG. 2. In this way, the NFC communication function can be realized. It should be noted that, in FIG. 8, the single-ended feeding is unbalanced feeding, and the output of the NFC antenna is a balanced signal. The balanced signal may be converted into an unbalanced signal by a balanced-unbalanced converter in the matching network.

Figure 9:
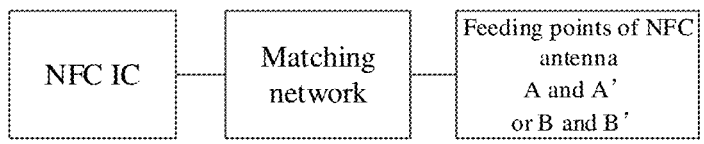
FIG. 9 is a structural schematic view of an NFC communication apparatus according to further another embodiment of the present disclosure.

As another example, referring to FIG. 9, FIG. 9 is a structural schematic view of an NFC communication apparatus according to further another embodiment of the present disclosure. Differential feed is adopted as an example, and the NFC chip is the NFC IC. The NFC IC is connected to the matching network, and the matching network is connected to the feeding point of the NFC antenna. For example, the matching network may be connected to the end A and end A' in FIG. 5 or FIG. 6, or may be connected to the end B and the end B'. In this way, the NFC communication function can be realized.

It should be noted that the explanation of the NFC antenna used in the mobile terminal in the foregoing embodiments is also applicable to the NFC communication apparatus used in the mobile terminal in the embodiments, and will not be repeated here.

The NFC communication apparatus for a mobile terminal according to the embodiments of the present disclosure adopts one FPC antenna for radiation, which can effectively reduce the occupied area of the NFC antenna and has strong applicability in an increasingly complex mobile terminal antenna environment. In addition, the use of a separate FPC antenna for radiation, not shared with the main antenna, can reduce the impact on the performance of the main antenna by avoiding a certain distance in the design process. Moreover, the use of large inductors may be avoided, which is conducive to device layout.

In the description of this specification, descriptions with reference to the terms "an embodiment", "some embodiments", "examples", "specific examples", or "some examples" etc. mean specific features described in conjunction with the embodiment or example. The structures, materials, or characteristics are included in at least one embodiment or example of the present disclosure. In this specification, the schematic representations of the above terms do not necessarily refer to a same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without contradicting each other.

In addition, the terms "first" and "second" are only intended for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "a plurality of" means at least two, such as two, three, etc., unless specifically defined otherwise.

Any process or method description in the flowchart or described in other ways herein can be understood as a module, segment or part of code that includes one or more executable instructions for implementing custom logic functions or steps of the process. The scope of the preferred embodiments of the present disclosure includes additional implementations, which may not be in the order shown or discussed, including performing functions in a substantially simultaneous manner or in the reverse order according to the functions involved, as should be understood by those skilled in the art to which the embodiments of the present disclosure belong.

The logic and/or steps represented in a flowchart or otherwise described herein, for example, may be considered a sequential list of executable instructions for implementing a logical function that may be specifically implemented in any computer-readable medium for use by an instruction execution system, device, or apparatus (e.g., a computer-based system, a system including a processor, or other system that can take instructions from an instruction execution system, device, or apparatus and execute For purposes of this specification, a "computer readable medium" may be any device that can contain, store, communicate, transmit, or transfer a program for use by or in conjunction with an instruction execution system, device, or apparatus. More specific examples of computer-readable medium (a non-exhaustive list) include: electrically connected sections with one or more wiring (electronic devices), portable computer disk cartridges (magnetic devices), random access memory (RAM), read-only memory (ROM), erasable editable read-only memory (EPROM or flash memory), fiber optic devices, and portable compact disc read-only memory (CDROM). Alternatively, the computer readable medium may even be paper or other suitable medium on which said program can be printed, since said program can be obtained electronically, for example, by optical scanning of the paper or other medium, followed by editing, decoding or, if necessary, processing in other suitable ways, and then storing it in the computer memory.

It should be understood that each part of the present disclosure can be implemented by hardware, software, firmware, or a combination thereof. In the above embodiments, multiple steps or methods can be implemented by software or firmware stored in a memory and executed by a suitable instruction execution system. For example, if it is implemented by hardware as in another embodiment, it can be implemented by any one of or a combination of the following technologies known in the art: discrete logic gate circuits for implementing logic functions on data signals Logic circuit, application specific integrated circuit with suitable combinational logic gate circuit, programmable gate array (PGA), field programmable gate array (FPGA), etc.

Those skilled in the art can understand that all or part of the steps carried in the method of the foregoing embodiments can be implemented by a program instructing relevant hardware to complete. The program can be stored in a computer-readable storage medium, and the program can be stored in a computer-readable storage medium. When the program is executed, one of the steps of the method embodiment or a combination thereof may be performed.

In addition, each functional unit in each embodiment of the present disclosure may be integrated into one processing module, or each unit may exist alone physically, or two or more units may be integrated into one module. The integrated modules can be implemented in the form of hardware or software functional modules. If the integrated module is implemented in the form of a software function module and sold or used as an independent product, it can also be stored in a computer readable storage medium.

The storage medium may be a read-only memory, a magnetic disk or an optical disk, etc. Although the embodiments of the present disclosure have been shown and described above, it can be understood that the above-mentioned embodiments are exemplary and should not be construed as limiting the present disclosure. Variations, modifications, replacements and variants of the above embodiments can be made by those skilled in the art within the scope of the present disclosure.

What is claimed is:

1. A near field communication (NFC) antenna for a mobile terminal, comprising:
 a substrate;
 a ferrite, disposed on a first side of the substrate and configured to shield influence of a metal environment under the substrate on NFC performance;
 a first flexible printed circuit (FPC) antenna, disposed on the ferrite and comprising a first end and a second end; and
 a second FPC antenna, comprising a third end and a fourth end, disposed on a second side of the substrate away from the first FPC antenna and oppositely arranged to the ferrite and the first FPC antenna,
 wherein the first FPC antenna is configured as a main radiation area, and the second FPC antenna is configured as a conduction area.

2. The NFC antenna according to claim 1, wherein the first end is a feeding point, and the second end is a grounding point.

3. The NFC antenna according to claim 2, wherein a length of the first FPC antenna is greater than a length of the ferrite.

4. The NFC antenna according to claim 1, wherein the second end and the fourth end are connected.

5. The NFC antenna according to claim 1, wherein the first end faces the third end, and the second end faces the fourth end.

6. The NFC antenna according to claim 1, wherein the second FPC antenna is disposed between the substrate and the ferrite.

7. The NFC antenna according to claim 1, wherein the first FPC antenna is disposed on the first side of the substrate, and the second FPC antenna is disposed on the second side of the substrate opposite to the first FPC antenna.

8. A near field communication (NFC) communication apparatus for a mobile terminal, comprising:
 an NFC antenna, comprising:
  a substrate;
  a ferrite, disposed on a first side of the substrate and configured to shield influence of a metal environment under the substrate on NFC performance;
  a first flexible printed circuit (FPC) antenna, disposed on the ferrite and comprising a first end and a second end; and
  a second FPC antenna, comprising a third end and a fourth end, disposed on a second side of the substrate away from the first FPC antenna and oppositely arranged to the ferrite and the first FPC antenna,
  wherein the first FPC antenna is configured as a main radiation area, and the second FPC antenna is configured as a conduction area;
 a matching network, connected to the NFC antenna; and
 an NFC chip, connected to the matching network.

9. The NFC communication apparatus according to claim 8, wherein the first end is a feeding point, and the second end is a grounding point.

10. The NFC communication apparatus according to claim 9, wherein a length of the first FPC antenna is greater than a length of the ferrite.

11. The NFC communication apparatus according to claim 8, wherein the second end and the fourth end are connected.

12. The NFC communication apparatus according to claim 8, wherein the first end faces the third end, and the second end faces the fourth end.

13. The NFC communication apparatus according to claim 8, wherein the second FPC antenna is disposed between the substrate and the ferrite.

14. The NFC communication apparatus according to claim 8, wherein the first FPC antenna is disposed on the first side of the substrate, and the second FPC antenna is disposed on the second side of the substrate opposite to the first FPC antenna.

* * * * *